US007873605B2

(12) United States Patent
Bhattacharyya et al.

(10) Patent No.: US 7,873,605 B2
(45) Date of Patent: Jan. 18, 2011

(54) APPARATUS TO SELECTIVELY REMOVE THE EFFECTS OF TRANSACTIONS IN ONLINE DATABASE AND ENABLE LOGICAL RECOVERY

(75) Inventors: Manosiz Bhattacharyya, San Jose, CA (US); Bipul Sinha, Foster City, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 551 days.

(21) Appl. No.: 11/699,689

(22) Filed: Jan. 29, 2007

(65) Prior Publication Data

US 2008/0183686 A1    Jul. 31, 2008

(51) Int. Cl.
*G06F 7/00*    (2006.01)
*G06F 17/00*    (2006.01)
(52) U.S. Cl. .......................... 707/685; 707/679; 714/15
(58) Field of Classification Search ......... 707/674–686, 707/999.202; 714/15
See application file for complete search history.

(56) References Cited

U.S. PATENT DOCUMENTS

| | | | | |
|---|---|---|---|---|
| 5,878,206 A | * | 3/1999 | Chen et al. ..................... 714/19 |
| 6,058,389 A | * | 5/2000 | Chandra et al. ................ 707/1 |
| 6,374,264 B1 | * | 4/2002 | Bohannon et al. .......... 707/202 |
| 6,625,602 B1 | * | 9/2003 | Meredith et al. ............ 707/703 |
| 6,671,686 B2 | * | 12/2003 | Pardon et al. ..................... 1/1 |
| 6,769,074 B2 | * | 7/2004 | Vaitzblit ...................... 714/16 |
| 7,277,900 B1 | * | 10/2007 | Ganesh et al. .............. 707/202 |
| 2004/0068501 A1 | * | 4/2004 | McGoveran .................. 707/8 |
| 2004/0220961 A1 | * | 11/2004 | Lee et al. .................... 707/102 |
| 2005/0131966 A1 | * | 6/2005 | Lou .......................... 707/204 |

OTHER PUBLICATIONS

Meckenstock et al., "Rolling Back in a Selective Way An Approach to Recovery for Interactive and Long-Running Transactions", 2nd Int'l Baltic Workshop on DB and IS, 1996.*

* cited by examiner

*Primary Examiner*—Shew-Fen Lin
(74) *Attorney, Agent, or Firm*—Hickman Palermo Truong & Becker LLP

(57) ABSTRACT

A method and apparatus for selective removal of user data changes is provided. In one embodiment, the methodology is implemented by a logical recovery mechanism. Upon receiving a request to selectively remove user data changes stored in a database, the mechanism creates an empty set of transactions to be populated for selective removal, identifies one or more transactions and places them in the causal set of transactions. The mechanism further identifies other transactions that logically depend on any transaction already in the causal set of transactions. Finally, either while the causal set of transactions is being identified or after the identification is completed, the mechanism also determines user data changes made by the causal set of transactions. One or more compensating transactions may be generated by the logical recovery mechanism, which when executed, reverse the user data changes.

22 Claims, 4 Drawing Sheets

User Data 106

User Table 118 - 1
120-1-1
120-1-2

User Table 118 - 2
120-2-1

User Table 118 - 3
120-3-1

User Table 118 - 4
120-4-1

FIG. 2

APPARATUS TO SELECTIVELY REMOVE THE EFFECTS OF TRANSACTIONS IN ONLINE DATABASE AND ENABLE LOGICAL RECOVERY

This application is related to U.S. Provisional Patent Application No. 60/500,509, entitled "System, Structure, Interface, and Semantics For Implementing Row Versions: Accessing Past Versions Of A Data Item"; U.S. Provisional Patent Application No. 60/500,510, entitled "Method and Mechanism For Row Versioning"; the contents of all of which are incorporated by this reference in their entirety for all purposes as if fully set forth herein.

FIELD OF THE INVENTION

The present invention relates to database systems and, more specifically, database systems that support selective removal of transactions.

BACKGROUND

Generally speaking, in a typical database system that maintains both user data and system data, one may classify data problems into two categories. The first category is physical errors caused by hardware, operating systems, or internals of the database system itself. The errors in the first category may affect both user data and system data. For example, a transaction may fail in the middle of processing due to a system error such as power failure; as a result, various repositories of data, including user data kept by the database system relating to the failed transaction, may be left in an inconsistent state. To reduce incidents of physical errors, one may use reliable hardware, redundancy, backup, powerful, stable operating systems, or mature database system products. Furthermore, problems such as a database system being left in an inconsistent state after a system error may be corrected using redo and undo logs to a certain extent. Because of technology improvements, physical errors in a database system are nowadays rare and, when a physical error does happen, the database system has effective tools to take corrective actions and prevent partial, inconsistent data being persisted in the database system at the physical level.

The other category of data problems is logical errors caused by applications. This category affects mostly user data at a logical level. Integrity (such as atomicity, consistency, isolation and durability) of each transaction in a set of one or more transactions may have been properly maintained from a transaction processing perspective. However, user data created by certain transactions in the set of transactions may be logically erroneous because application logic relating to the certain transactions is erroneous. For example, where an application that moves funds in Euro currency is used to move funds in other currencies without applying appropriate conversion factors, user data manipulated by such an application would be logically erroneous even though integrity of each such fund moving transaction might have been properly maintained. The user data at the physical level would appear to be correctly in a consistent state—e.g., no constraint is violated, no transaction integrity is breached, indexes are correctly maintained, logs are correctly created, system tables are correctly updated, etc. However, since some funds may be over-transferred (e.g., British Sterling) while some others may be under-transferred (e.g., Japanese Yen), the user data are incorrect in a logical sense (i.e., at a logical level).

To fix data problems at the logical level, a database administrator may typically take the database system offline, spend a considerable time to trouble shoot root causes, and come up with some corrective measures if feasible. However, such fixing by the database administrator would likely be error-prone, because of the level of difficulty involved in determining exactly what transactions are involved in a logical error. Furthermore, significant downtime may be incurred under this approach.

Alternatively, a database administrator may simply resort to rolling back the database system to a database image existing at a particular time in the past. This approach has at least two disadvantages. One is that if the particular time is too far in the past, a large amount of good data may be lost. The other is that if the particular time is too recent, the data problems may only be fixed in a partial, inconsistent manner.

Therefore, a better mechanism that would improve selectively removing user data changes made by transactions is needed.

DESCRIPTION OF THE DRAWINGS

The present invention is illustrated by way of example, and not by way of n, in the figures of the accompanying drawings and in which like reference numerals similar elements and in which:

FIG. 2 is a block diagram in which one embodiment of the present invention may be implemented.

DETAILED DESCRIPTION

Figure 1:
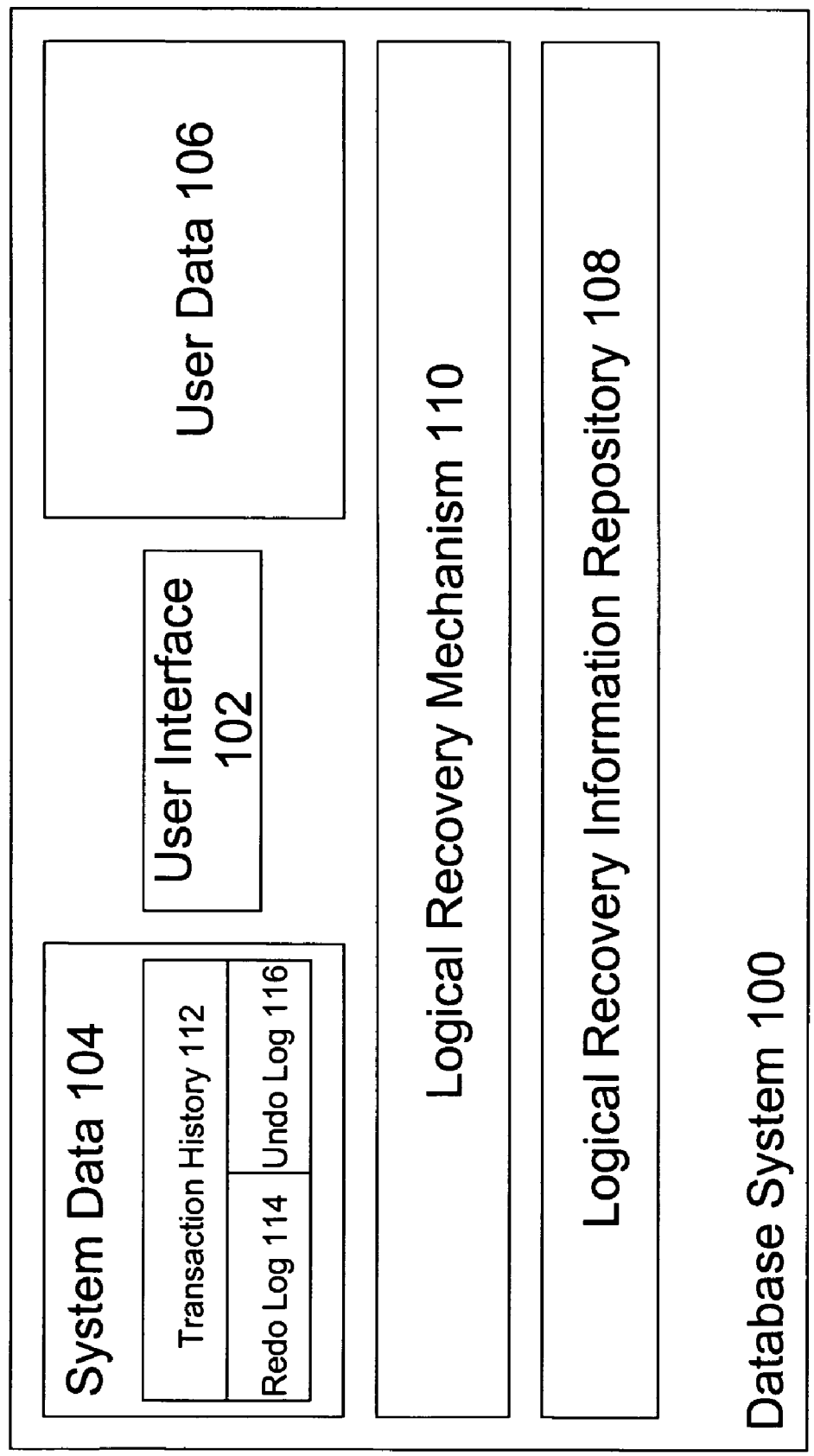
FIG. 1 is a functional block diagram of a system in which one embodiment of the present invention may be implemented.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a logical recovery mechanism may be implemented in a database system to support selective removal of user data changes made by a causal set of transactions. As used herein, the term "selective removal" does not necessarily mean deletion of one or more rows from a table, but rather means removal of a prior data change, be it a deletion, an insertion or an update. As used herein, the term "causal set" means that a dependency relationship between any pair of dependent and depended transactions in such a set follows a definitive time order (i.e., a dependent transaction happens later in time than its depended transaction; thus, causally speaking, an operation—such as an SQL statement—within the depended transaction is capable of influencing operations of the dependent transaction). In one embodiment, upon receiving a request for selective removal, the logical recovery mechanism creates an empty causal set of transactions and populates the causal set with one or more transactions that may be identified from the received request (i.e., request-identifiable transactions). In one embodiment, selective removal of user data changes is achieved by removing changes both from the request-identified transactions and from subsequent transactions that are dependent on the changes made by the request-identified transactions. Note that it is not necessary for all of the request-identified transactions to occur before all of the dependent transactions; in fact, some of the request-identified transactions and some of the dependent transactions may be time-wise interleaved.

While it is possible that a request-identified transaction may comprise only read-only operations, more typically, some, or all, of the request-identified transactions may have directly caused some user data changes maintained in the database system. For example, a data location in the database system may have been deleted, modified, inserted, or otherwise manipulated by a particular transaction among the request-identified transactions. Any transactions subsequent to the particular transaction that read from, write to, or otherwise manipulate, the same data location are (logically) dependent transactions relative to the particular transaction (subject to user specification to a certain extent, as will be further explained) This dependency between the particular transaction and the subsequent transactions occurs because, if not for the changes made by the particular transaction, the subsequent transactions, by virtue of reading the particular transaction's changes, may have behaved in a different way than they would have otherwise. As a result, the logical recovery mechanism includes such subsequent transactions in the causal set.

Furthermore, as a corollary, subsequent user data changes directly made by the subsequent transactions, no matter where they were made, are deemed as also depending on the particular transaction. From these subsequent changes, additional dependencies may be identified between further subsequent transactions and each of the subsequent transactions, in the same manner as the dependencies between the subsequent transactions and the particular transaction are identified. As a result, the logical recovery mechanism includes such further subsequent transactions in the causal set.

This process of identifying dependencies may be iterated and recursively repeated for each prior identified transaction in the causal set of transactions, whether through the request or not, for the purpose of identifying further dependent transactions. In one embodiment, the logical recovery mechanism utilizes database logs kept by the database system in this identification process.

Once the causal set of transactions is completely established, the selective removal of the user data changes may be performed with one or more compensating transactions in accordance with a particular embodiment of the present invention. Such a compensating transaction would compensate (or reverse) the user data changes made by the causal set of transactions. As a result, the user data changes made directly by the causal set of transactions are (selectively) removed from the database system.

In one embodiment, a compensating transaction may be managed in the same manner by the database system as are any other transactions. Thus, ACID properties of compensating transactions are guaranteed by the database system, in the same way as are any other transactions.

In this manner, only bad data and the effects thereof are selectively removed from the database system. The database system is logically moved back in time to a state as if the transactions in the causal set never happened. In the meantime, good data, such as intervening user data changes made by transactions that are not dependent on any of the causal set of transactions, are still kept in the database system and may still influence any other ongoing or future transactions.

Besides the benefits discussed above, selective removal of user data changes may result in, but is not limited to, one or more of the following additional benefits: (1) A user would not have to manually track down transactions for recovery, thereby avoiding use of an error-prone, and ad hoc process of removing user data. Also, with selective removal, nor would the user have to flash back tables or system to a prior version of data items at a prior time in a brute force manner. (2) Because bad data is surgically (so to speak, or selectively) removed, time availability of database systems is improved. For example, an online database system that contains bad data would not be required to be taken offline while a compensating transaction that removes the bad data is being run. (3) As noted, the compensating transaction may be run in the form of an ordinary transaction. The database system may still keep all log information of transactions in the causal set of transactions for selective removal, even though the logical effects of those transactions are removed from the database system. Additionally, the database system may create log information for the compensating transaction, just as for any other transactions. Thus, like other transactions, integrity such as ACID properties of the compensating transaction would be guaranteed by the database system. And (4) like other transactions, the compensating transaction can be rolled back if the user so decides. Thus, as compared with the traditional, error-prone, ad hoc processes of data removals or flashback brute force recoveries, the logical recovery process under this new mechanism is not only less error-prone, but also more error-tolerant because it may be retried multiple times to achieve a desired recovery state of the user data.

The mechanism in the present invention in various embodiments may be used regardless of the format and data structures used to store the user data. For example, the user data can reside in structures, in any form, such as SQL tables, object-relational tables, files, etc. The mechanism may also be used regardless of the types of user data stored such as basic data types, complex data types, opaque data types, a combination thereof, etc.

Database Logs

In accordance with one embodiment of the present invention, the methodology disclosed herein may be implemented by a logical recovery mechanism that may be a part of a database system. For purposes of the present invention, the database system may be any type of database system. Examples of database systems may include but are not limited to those commercially available from Oracle Corporation, Redwood Shore, Calif. To illustrate how such a logical recovery mechanism may operate in accordance with one embodiment of the present invention, reference will be made to FIG. 1.

As shown in FIG. 1, a database system 100 may comprise a user interface 102, a first repository for system data 104, a second repository for user data 106, a repository for logical recovery information 108, and a logical recovery mechanism 110. The system data 104 may comprise one or more database logs, such as a transaction history 112, a redo log 114 and an undo log 116. Records in the redo log 114 maintain enough information to redo a change recorded therein. On the other hand, records in the undo log 116 maintain enough information to undo a change recorded therein. The system data 104 may further comprise database schema information such as for user tables maintained by the database system. A part, or a whole, of any of the system data may be maintained on tape, on disk, in memory, in cache, etc, as long as it is accessible to the logical recovery mechanism. The redo log 114 and the undo log 116 may maintain detailed information of data operations occurred in the database system 100. A transaction, whether committed or failed, may comprise one or more data operations. The detailed information in the redo log 114 and the undo log 116 may comprise two images of data accessed or manipulated by a data operation, one before and the other after the data operation. In one embodiment, detailed information in the redo log 114 and the undo log 116 that is associated with a data operation allows the logical recovery mechanism to create a compensating statement or command, which may be included and executed within a compensating transaction to reverse any prior change made by the data operation. For example, if a data operation in the logs corresponds to a deletion statement, a compensating insertion statement may be created by the logical recovery mechanism based on a before image of the data operation (deletion) in the logs.

In one embodiment, if the data operation is read-only or otherwise makes no changes to user data, it may be ignored, or not included, when the logical recovery mechanism generates compensating statements after the causal set is completely populated. However, such a read-only data operation may still be counted for determining dependency relationships among transactions but itself does not require removal of any data accessed thereby, depending on a user configurable dependency policy, as will be further explained. In one embodiment, such a read-only data operation is but one of the data operations that makes up a transaction and other data operations in the same transaction may be data manipulation operations.

The transaction history 112 maintains high level information about transactions that the database system has processed. High level information that is associated with a transaction may comprise, but is not limited to, any or all of i) timing information as to when the transaction occurred (e.g., in the form of a time window or an approximate time), ii) a transaction identifier that is unique among all transactions processed by the database system, iii) a transaction name that may or may not be unique among the transactions, or iv) optionally some detailed level information of the transactions including pointers to other information repositories maintained in the database system. For example, pointers may be maintained in the high level information by which reference may be made to detailed information of data operations that comprise the transaction in the redo log 114 and the undo log 116. In one embodiment, any or some of the transaction history 112, the redo log 114 and the undo log 116 may also maintain information about read-only operations made by a transaction, not just data manipulation operations.

Determining User Data Changes

In some embodiments, the user data 106 of FIG. 1 may comprise one or more user tables 118 such as SQL tables that comprise various numbers of rows, as shown in FIG. 2. For illustration, four tables (118-1, 118-2, 118-3 and 118-4) are shown in the figure. Each of the user tables 118 may comprise a set of zero or more rows. For the purpose of illustration, only two rows 120-1-1 and 120-1-2 are indicated for the user table 118-1; and only one row 120 is indicated for each of the remaining three user tables 118. Each row 120 comprises row data that may be created, manipulated, or accessed by a transaction, and optionally system-generated data fields such as a row identifier (RowId). In one embodiment, from a time at which a RowId is assigned to a row when the row is inserted, to another time at which a RowId is withdrawn or reassigned when the row is deleted, RowId is immutably associated with the row. During a life cycle of the row (from insertion to deletion), the assigned RowId may only be accessed read-only even though other parts of the row may be altered by a (user level) transaction.

Initially, the logical recovery mechanism 110 receives a request to selectively remove user data changes triggered by a particular transaction, say transaction-A. In one embodiment, this request may be received in the form of a statement or a command issued by a user at a user interface such as SQL*Plus, commercially available from Oracle Corporation. In one embodiment, this request may comprise more than one transaction to be selectively removed.

In some embodiments, identifying a transaction such as transaction-A for selective removal means identifying a unique transaction identifier that is associated with the transaction. In one embodiment, the logical recovery mechanism 110 may directly determine such a transaction identifier by extracting it from the request. In an alternative embodiment, the logical recovery mechanism 110 first extracts a transaction name and, optionally or additionally, other information such an approximate time when an associated transaction occurs, from the request, and then looks up for a corresponding transaction identifier in the system data 104 using the transaction name and the other information determined. In some embodiments, a transaction that has inappropriately changed a row in a table may be identified using LogMiner, a utility in database products commercially available from Oracle Corp. Such a transaction, identified using LogMiner, may be identified (or specified) in the request for selective removal as transaction-A in the current example. In embodiments where transaction names may or may not be unique, with the transaction name and the associated timing information extracted from the request, the logical recovery mechanism can utilize the system data such as the transaction history 112 to determine a corresponding transaction identifier.

Based on transactions (or their transaction identifiers) identified from the user request, the logical recovery mechanism 110 determines what changes, if any, have been made to the user data 106 directly by the transactions. In one embodiment, the logical recovery mechanism 110 determines user data changes by locating pointers that are associated with each of the identified transactions in the transaction history 112 and using the pointers to map to detailed transaction information in the redo log 114 and the undo log 116. Based on the detailed information in the redo and undo logs, the logical recovery mechanism can determine the user data changes made by identified transactions.

The logical recovery mechanism 110 may find nothing or only read-access data operations in the transaction history for a transaction that has not directly made any user data changes. In an alternative embodiment, even if the logical recovery mechanism 110 finds pointers in the transaction history 112 that are associated with the transaction that has not directly made any user data changes, those pointers may not map to any records or high level information in the redo and undo logs. In one embodiment, if it is determined that the identified transaction made no direct user data changes, the logical recovery mechanism 110 returns an indication or error code to a calling function, a calling procedure, or a user interface where the request was issued, indicating that the identified transaction passed in the request made no user data changes. The user may optionally load additional transaction history information to the transaction history 112 from archives, and retry the same request.

If it is determined that a request-identified transaction made no direct user data changes (e.g., the transaction failed before any change occurs, or only comprised read-only operations), in one embodiment, the logical recovery mechanism 110 excludes the transaction from the causal set of transaction for selective removal.

Identifying Scope of User Data Changes and Dependent Transactions

If the logical recovery mechanism 110 finds the high level information that is associated with a transaction (e.g., by matching its transaction identifier with what maintained in the transaction history 112), then the logical recovery mechanism 110 next determines the scopes of the user data changes 106 made by the transaction. In one embodiment, the transaction history 112 additionally maintains information indicating which rows in which table are accessed by the transaction, say transaction-A. For each row included in the user data changes for determining dependency of subsequent transactions, the database system can use the row-level information to determine whether another transaction has manipulated, or read (if reading is a qualifying data operation as specified in a dependency policy, as will be further explained later), a row (e.g., having the same RowId). If it is determined that another transaction has indeed done so, then this other transaction will be included in the causal set of transactions for selective removal. In a particular embodiment, the database system determines whether a RowId associated with a row has been withdrawn or reassigned. If it is determined that the RowId has been withdrawn or reassigned by a deletion type of data operation, then the logical recovery mechanism may determine that the deletion type of data operation ended the row's life cycle and hence would only search for dependent transactions up to the point of a transaction that comprises the deletion type of data operation.

Alternatively, the logical recovery mechanism may determine the scope of user data changes and subsequent dependent transactions using both the transaction history 112 and the redo and undo logs. This may be done by using pointers maintained in the high level information that is associated with the transaction in the transaction history 112. For example, combining the pointer information of transaction-A in the transaction history 112 with detailed information about changes of all database operations that make up transaction-A in the redo log 114 and the undo log 116, the logical recovery mechanism 110 may determine that the two rows in the user table 118-1, as shown in FIG. 2, have been changed directly by transaction-A at a time-A. Furthermore, in one embodiment, using the detailed information in the redo and/or undo logs, the logical recovery mechanism determines whether the RowId associated with the row has been withdrawn or reassigned. If it is determined that the RowId has been withdrawn or reassigned by a deletion type of data operation, then the logical recovery mechanism may determine that the deletion type of data operation ended the row's life cycle and hence would search for dependent transactions up to the point of a transaction comprising the deletion type of data operation.

In this manner, given an earlier transaction in the causal set of transaction for selective removal, the logical recovery mechanism may determine the scope of user data changes associated with any data operation of the earlier transaction, identify subsequent transactions that depend on the user data changes, and include the subsequent transactions in the causal set of transactions for selective removal, as long as the database system, in differing embodiments, maintains the relevant information about transactions in the database logs.

Write After Write Dependency

A transaction, say transaction-B, has a write after write dependency on another transaction such as transaction-A, if transaction-B is a subsequent transaction to transaction-A, and if both transaction-A and transaction-B modifies a common data location such as the row 120-1-1. In the context of a database system, this would, for example, mean that transaction-B updates or deletes a row that has been inserted or updated by transaction-A.

Read After Write Dependency

In a situation where a subsequent transaction read the user data changed by an earlier transaction, but otherwise made no change to any data, the logical recovery mechanism 110 ignores such a subsequent transaction for selective removal of user data changes.

In a situation where an earlier transaction in the causal set made changes to user data, and a subsequent transaction read the changed user data but only modified other parts of the user data not touched by the earlier transaction, the logical recovery mechanism 110 may still exclude such a subsequent transaction from the causal set in accordance with one embodiment of the present invention. In an alternative embodiment, however, the logical recovery mechanism may provide, or delegate to, a user interface or a configurable dependency policy to solicit user input as to whether such a subsequent transaction should be considered as a dependent transaction. A user may specify through the user interface, in the original request or alternatively when prompted for further input when the original request is being processed, or still alternatively in a configurable dependency policy that is preconfigured and effective at the time of the user request being processed, as to whether such a subsequent transaction (read a data location after another transaction's write to the location but write elsewhere) should be considered as a dependent transaction. If so specified, then the subsequent transaction would be considered a dependent transaction on the earlier transaction and thus included in the causal set of transactions for selective removal for user data changes.

For example, a transaction, say transaction-C, may read the user data (the rows 120-1-1 and 120-1-2) changed by the particular transaction, but only change the user data located in other parts of the user data 106, say row 120-2-1 in a user table 118-2. Whether transaction-C would be included in the causal set of transactions for selective removal for user data changes would depend on relevant specification by the user through a dependency policy.

Constraint Dependency—Unique Key Constraints

Constraints are devices for ensuring logical consistency between different changes to a database system (e.g., the user data 106). One type of constraint is a primary or unique key constraint, typically used for ensuring uniqueness of key values in a unique key index. A constraint dependency can exist between a subsequent transaction, say transaction-D, and an earlier transaction such as transaction-A, if transaction-D inserts the same key value in a unique key index as that has been removed by transaction-A (assuming no other insertion and deletion transactions between transaction-A and transaction-D relating to the same key value). In this scenario, but for the removal of the key value by transaction-A, transaction-D cannot insert the key in a subsequent operation. Thus, if transaction-A were in the causal set, transaction-D would be included in the same.

To identify this dependency, in one embodiment, the logical recovery mechanism 110 first determines from database schema information maintained by the database system whether a row that was removed by a transaction such as transaction-A is associated with any unique key index. If it is determined that the removed row is associated with one or more unique key indexes, then, for each such index, the logical recovery mechanism 110 determines a key value relating to the removed row, uses the table information associated with transaction-A in the transaction history or in the redo and undo logs to identify subsequent transactions that have manipulated the same table that contained the removed row, and identifies a subset among the subsequent transactions that inserts a row having the same key value as that transaction-A has removed. If such a subset exists, the logical recovery mechanism includes the transactions in the subset in the causal set.

Constraint Dependency—Foreign Key Constraints

Foreign key constraints exist between two tables (parent and child) through a column that is shared between them. More specifically, the parent table maintains a primary or unique constraint on a column; and the database system guarantees that a value in a corresponding column in the child table exists as a unique entry in the column in the parent table. A constraint dependency can exist between a subsequent transaction, say transaction-E, and an earlier transaction such as transaction-A, if transaction-E inserts a row in the child table having the same foreign key value as that has been inserted in the parent table by transaction-A. If selective removal were performed for transaction-A (i.e., the row in the parent table inserted by transaction-A is deleted) but not for transaction-E (i.e., the row in the child table inserted by transaction-E is left alone), then the row in the child table would be left without a corresponding parent key, thereby violating a corresponding foreign key constraints. Thus, if transaction-A is in the causal set of transactions for selective removal, transaction-E is also included in the same set for selective removal.

Conversely, a constraint dependency can exist between a subsequent transaction, say transaction-F, and an earlier transaction such as transaction-A, if transaction-F deletes a row in the parent table having the same foreign key value as that that has been removed in the child table by transaction-A. If selective removal were performed for transaction-A but not for transaction-F, then the row in the child table would be reinserted by a compensating transaction but would have no corresponding parent key, thereby violating a corresponding foreign key constraints. Thus, if transaction-A is in the causal set of transactions for selective removal, transaction-E is also included in the same set for selective removal.

To identify these two dependencies, in one embodiment, the logical recovery mechanism 110 determines from database schema information maintained by the database system whether a row that was inserted or removed by a transaction such as transaction-A is associated with any foreign key constraint. If it is determined that the inserted or removed row is associated with one or more foreign key constraints, then, for each such constraint, the logical recovery mechanism 110 searches the table information associated with transaction-A in the transaction history or in the redo and undo logs. The table information thus found is used to identify subsequent transactions that have manipulated the corresponding table in the foreign key constraint that contained a row having the same foreign key value as the inserted or removed row. As a result, the logical recovery mechanism 110 identifies a subset of the subsequent transactions that inserts or removes the same key value as that transaction-A has inserted or removed. The logical recovery mechanism includes the identified subsequent transactions that have a foreign key constraint dependency on transaction-A in the causal set of transactions for selective removal.

Logical Constraint Dependencies

In contrast to unique key and foreign keys, some logical constraints may be defined in a logical expression, which if returns TRUE validates (column) values updated or inserted (e.g., a column must not be null), and the database system or an application may ensure that only those rows which evaluates to TRUE for the logical expression are created. In one embodiment, such logical expressions may be complex constraints involve checking for set membership or complex predicate expressions. In one embodiment, the logical recovery mechanism identifies additional dependency transactions based on the logical constraints that are to be included in the causal set of transactions for selective compensating, for the purpose of maintaining the logical constraints in the compensating transaction. In one embodiment, information about logical constraints may be found by the logical recovery mechanism in database schema. In one embodiment, if the logical recovery mechanism determines that selective removal of user data changes by a transaction included in the causal set would violate a logical constraint (e.g., based on the schema and log information), then the mechanism would identify what a corresponding logical expression is (from the schema information, for example). For each logical expression identified, the logical recovery mechanism 110 identifies additional transactions that yield input data (or data changes) that causes the logical expression to be FALSE, and includes these additional transactions in the causal set for the purpose of determining dependencies among transactions.

In one embodiment, at the time of executing a compensating transaction, the logical recovery mechanism ensures that a specific order in the selective removal of user data changes to keep logical constraints inviolate (at least at the end of the compensating transaction).

Parallel Transaction Dependencies

In one embodiment, the database system may support parallel transactions, each of which may contain multiple child transactions. In one embodiment, a parallel transaction is associated with one or more parallel data manipulation language statements. If the logical recovery mechanism determines that a child transaction of a parent transaction is dependent on a transaction say transaction-A in the causal set of transaction for selective removal, the logical recovery mechanism includes the parent transaction with all its child transactions in the causal set of transactions for selective removal. In one embodiment, information about parallel transactions and their makeup may be found by the logical recovery mechanism in the system data such as the transaction history or the redo or undo logs.

Queue Dependencies

In a typical scenario, identifying dependencies between transactions starts from a depended transaction that has already been identified as includable in the causal set. However, in some cases, what identified in the causal set may be a dependent transaction, and identifying dependencies between transactions may mean identifying a depended transaction that is not in the causal set but that is depended by a transaction in the causal set. For example, where a database system is but a member database system of a larger, distributed database system, advanced queuing messages may be used to request execution of a database operation by any member database system. That is, a transaction executing in one member database system may send (or enqueue) a message, requesting a certain data operation to be made. Another transaction in the same or a different member database system may receive (or dequeue) the message, and subsequently carry out the requested data operation. In such situations, in one embodiment, if either the sending transaction (i.e., depended transaction) or the receiving transaction (dependent transaction) is already included in the causal set of transactions for selective removal, both transactions may need to be compensated together, due to a so-called "queue dependency". This dependency identification may be made based on the database logs that maintain high level and detail level information about transactions relating to advanced queuing messaging. In one embodiment, queue dependency may be determined in the transaction history which records if a transaction is associated with a particular message (identifiable, for example, by a global message identifier across all the individual database systems) by correlating transactions involving a same message.

In one embodiment, if the sending and receiving transactions are located in different member database systems, the user may be alerted to this type of dependency and solicited for a decision as to whether the selective removal should be made for either or both sending or receiving transactions. In one embodiment, the user may opt to remove a depended or dependent transaction in another database system manually.

Multi-Level Dependency

Logical dependency does not exist merely between transactions identified from the user request and any transactions that directly depend on the request-identified transactions, but also between the present set of transactions that are already identified for selective removal and any other transactions that directly or indirectly depend thereon.

From a present collection of transactions in the causal set of transactions for selective removal, the logical recovery mechanism identifies all the user data changes made directly by the present collection of transactions and, based on the user data changes, determines further subsequent transactions that depend on any of the user data changes. If so, the further subsequent transactions are added to the causal set of transactions for selective removal. For example, suppose that the present collection of the causal set of transactions comprises transaction-A, transaction-B, and transaction-C (assuming the user has specified that read-after-write dependency between transaction-C and transaction-A constitutes an includable dependency relationship between the two). The logical recover mechanism 110 may identify all the user data changes by this collection of transactions as the rows 120-1-1 and 120-1-2 in the user table 118-1, the row 120-3-1 in the user table 118-3, and the row 120-2-1.

Once the user data changes directly made by the present collection in the causal set of transactions for selective removal is identified, the logical recovery mechanism may identify what other transactions may be dependent on the data changes. Any transaction that is logically dependent on the data changes made directly by the present collection of transactions is deemed as a dependent transaction that is includable in the causal set. In the present example, it may be determined that another transaction, transaction-F, made a data operation (either write or a qualified read under a user specification) on the row 120-2-1. Since transaction-C, which made an earlier data operation on the same row 120-2-1, is includable in the causal set for selective removal under a dependency policy, transaction-F will also be includable. Furthermore, once transaction-F is included, further data changes due to transaction-F are included in the causal set of transactions for selective removal for user data changes. In the present example, assuming transaction-F made a data operation on a row 120-4-1 in a user table 118-4, any data change on this row is included in the user data changes. In this manner, further transactions that are dependent on the user data changes can be identified and included in the causal set of transactions for selective removal.

However, if transaction-C is not includable because, for example, the dependency policy states read-after-write does not constitute a dependency, then transaction-F will not be included in the causal set of transactions for selective removal on the reason of its dependency on transaction-C. That does not mean transaction-F will never be included, but only that transaction-F may be included if it forms a qualified dependency with at least one transaction that is presently in the causal set of transactions for selective removal.

Compensation Transaction

Once the causal set of transactions are completely identified for selective removal for user data changes (no more transactions that are dependent on the data changes directly made by the causal set of transactions may be located based on the causal set of transactions), in one embodiment, the logical recovery mechanism 110 uses database statements (such as SQL statements) stored in the redo and undo logs that are associated with data operations of transactions in the causal set of transactions to generate a corresponding set of statements to compensate the changes made directly with the stored database statements in the logs. The corresponding set of statements that compensates the user data changes made by the causal set of transactions may be placed in one or more compensating transactions. In one embodiment, only one compensating transaction is generated for one set of transactions for selective removal as a result of one user request.

Once such a compensating transaction is determined, it may be executed by the logical recovery mechanism at the time of the user request or at a later time. As a result of executing the compensating transaction, the user data changes made directly by the identified transactions in the causal set are (selectively) removed from the database system.

In one embodiment, a compensating transaction is treated just like any other transactions and managed in the same manner by the database system as are any other transactions. Thus, ACID properties of compensating transactions are guaranteed by the database system, in the same way as are any other transactions. Furthermore, if a user wishes to rollback a compensating transaction that has been executed, a regular mechanism for rolling back a transaction, as provided by the database system, may be used.

Order in Removing Transactions

Assuming that all types of dependencies have been identified, the logical recovery mechanism may form a directed acyclic graph (DAG). Nodes of the DAG are populated by the transactions in the causal set, while edges of DAG are formed between any two transactions that have dependent relationships between them with arrow pointing towards the time increasing direction (i.e., if two transactions are dependent on each other, an arrow is drawn from the earlier one to the latter one). Assuming time always increases and generally can not flow back to past, there is no loop in the DAG. In one embodiment, the logical recovery mechanism executes statements (compensating data operations) in the compensating transaction in a post-order (reverse) fashion. That is, statements corresponding to children nodes are executed before statements corresponding to its parent node(s) are. In one particular embodiment, the logical recovery mechanism simply orders all the statements based on the time order of the transactions that are to be compensated, with statements corresponding to a more recent transaction executed before statements corresponding to an earlier transaction. In one embodiment, compensating data operations that reverse data changes made by (compensated) data operations in a (compensated) transaction in the causal set are also executed in a post-order fashion as compared with the order of execution of the compensated data operations that initially creates the data changes.

Logical Recovery Information Repository

In one embodiment, a database table, known as logical recovery information repository (108 of FIG. 1), is created and maintained in the database system to store transaction identification information for compensating transactions that have been performed and for transactions that have been compensated by the compensating transactions.

Suppose that a causal set of transactions for selective removal has been successfully identified and an associated compensating transaction is accordingly defined. Before the compensating transaction is executed, for each transaction identified in the causal set of transactions for selective removal, the logical recovery mechanism uses transaction identification information (e.g., transaction identifier) for each transaction in the causal set to find if the transaction in the causal set appears in the logical recovery information repository as either a compensating transaction that has been executed, or a transaction that has been compensated by a compensating transaction.

If a to-be-compensated transaction's identifier in the causal set is not found in the logical recovery information repository, the logical recovery mechanism keeps the to-be-compensated transaction in the causal set of transactions for selective removal.

On the other hand, if the to-be-compensated transaction's identifier is found in the logical recovery information repository, then the transaction is either a prior compensating transaction that has been successfully executed, or a compensated transaction whose associated compensating transaction has been successfully executed. In the former case—i.e., the compensated transaction is a prior compensating transaction that has been successfully executed—a removal of the changes directly made by the prior compensating transaction would unintentionally undo an earlier selective removal made by the prior compensating transaction. In the latter case, i.e., the compensated transaction is a prior compensated transaction whose associated compensating transaction has been successfully executed—a removal of the changes directly made by the prior compensated transaction would be redundant and result a "data not found" type of error or other unintended effects. In one embodiment, the logical recovery mechanism removes the to-be-compensated transaction from the causal set of transactions targeted for selective removal, when the to-be-compensated transaction's identifier is found in the logical recovery information repository.

In one embodiment, when a user requests executing a regular (not a selective removal type) backing out of a compensating transaction, the backing out will be executed regardless of whether it is a compensated transaction or a compensating transaction. Furthermore, if such a transaction involves a compensating transaction or a compensated transaction, transaction identification information for the compensating transaction (including transactions compensated thereby) or for the compensated transaction is removed from the logical recovery information repository 108, when the regular backing out is successfully executed.

In this manner, selective removals are repeatable, whether it is for a group of transactions or for different groups of transactions, without producing inconsistent results.

Sample Operation

Figure 3:
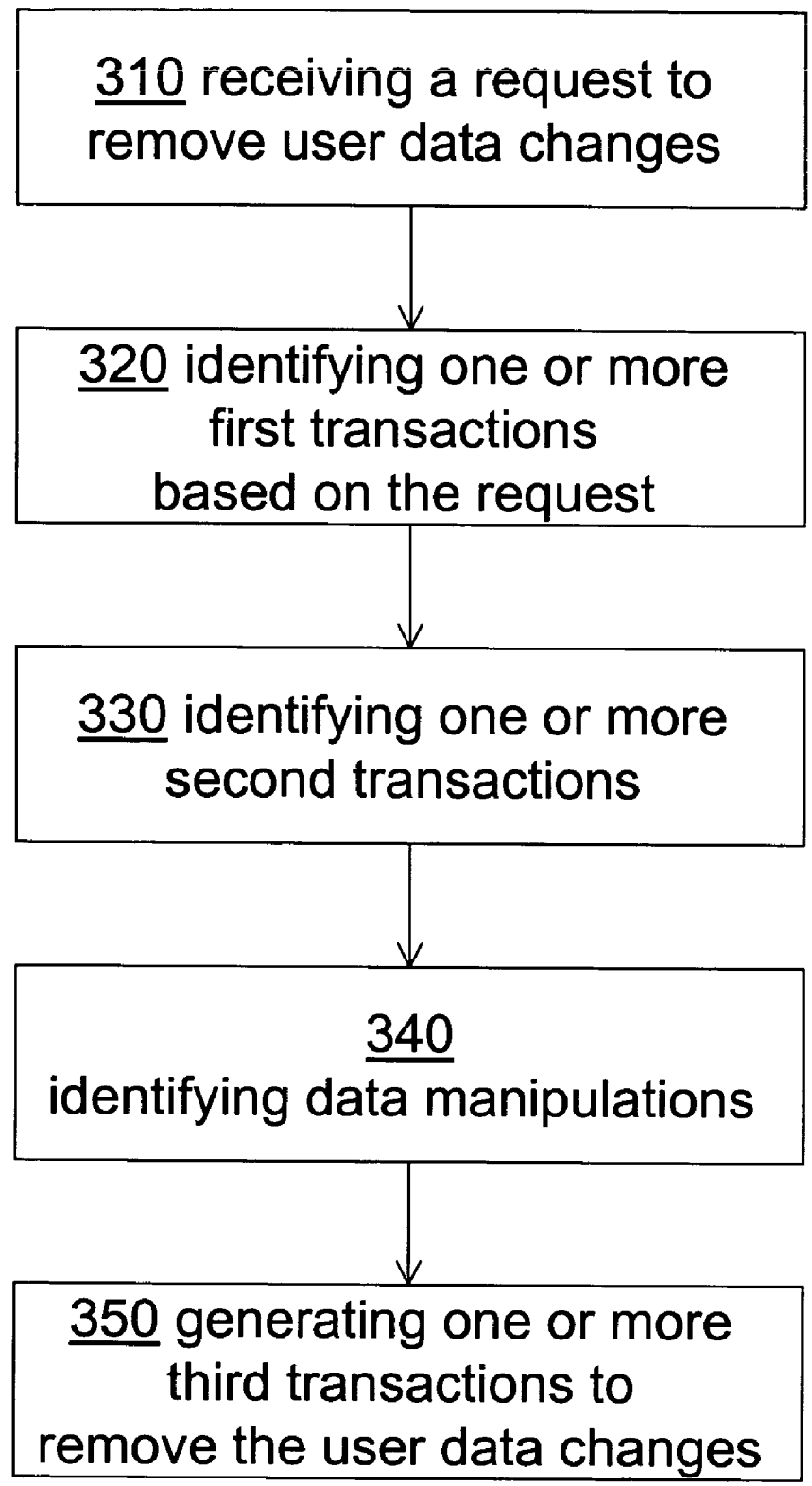
FIG. 3 is a flow diagram that illustrates a process for supporting selective removal of user data changes, according to one embodiment of the present invention.

A flow diagram which provides a high level overview of the methodology is shown in FIG. 3. Initially, the logical recovery mechanism receives a request to selectively remove user data changes stored in a database system (step 310 of FIG. 3). In one embodiment, the request may be issued as a command at a user interface. Upon receiving the request, the logical recovery mechanism creates an empty set of transactions for selective removal and identifies one or more first transactions based on the information in the request (step 320 of FIG. 3). In one embodiment, the one or more first transactions are added into the causal set of transactions.

Next, the logical recovery mechanism identifies one or more second transactions (step 330 of FIG. 3). In one embodiment, each of the one or more second transactions logically depends on at least one of the one or more first transactions. The one or more second transactions may directly or indirectly (e.g., such as multi-level dependency) depend on the first transactions. Once identified, the second transactions are also added into the causal set of transactions for selective removal.

In one embodiment, once the causal set of transactions for selective removal is complete (no more dependent transactions can be found for any transaction in the causal set of transactions), the logical recovery mechanism identifies user data changes associated with the causal set of transactions (step 340 of FIG. 3). In some other embodiments, the user data changes associated with the causal set of transactions are identified at the same time when dependency relationships between transactions are identified in step 330.

After all the user data changes are identified for the causal set of transactions, the logical recovery mechanism generates one or more third transactions to remove the user data changes stored in the database (step 350 of FIG. 3). In some embodiments, the one or more third transactions are compensating transactions that reverse the user data changes made by the causal set of transactions.

Thereafter, the one or more third transactions may be executed in a post-order fashion at a designated time.

Hardware Overview

Figure 4:
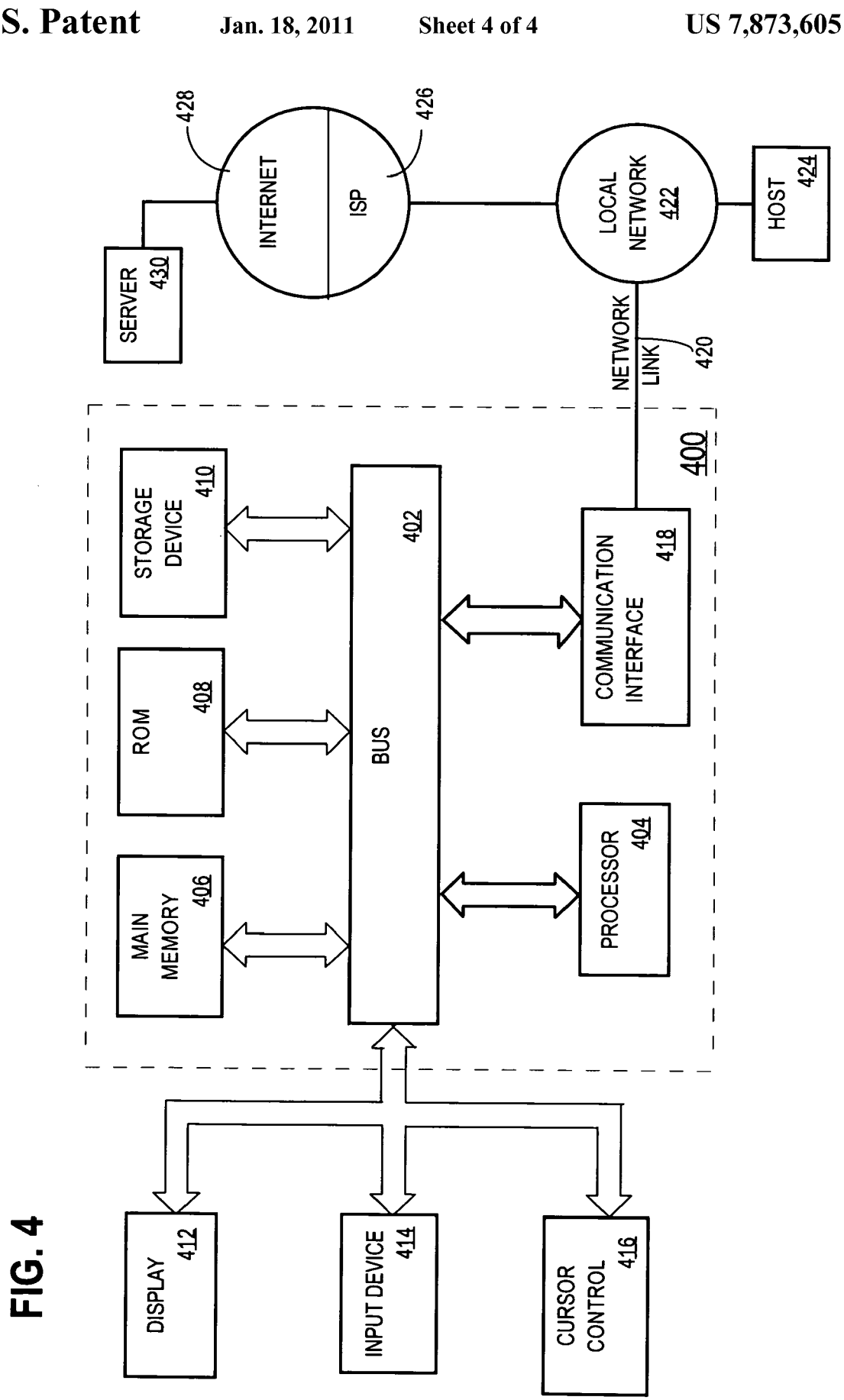
FIG. 4 is a block diagram of a system upon which the techniques described herein may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for removing database changes made by one or more first transactions to a database managed by a database system that executes transactions atomically without rolling back said one or more first transactions, comprising:
identifying one or more second transactions, each of which logically depends on at least one first transaction of the one or more first transactions, wherein said identifying one or more second transactions comprises identifying at least one second transaction that has a read-after-write dependency that is based on said at least one second transaction (1) reading but not changing a data item changed by said at least one first transaction and (2) changing a different data item different than said data item changed by said at least one first transaction;
identifying data manipulations made by the one or more first transactions and the one or more second transactions as data changes stored in the database system to be removed;
establishing the one or more first transactions and the one or more second transactions as a causal set of transactions; and
generating, based on the causal set of transactions, one or more compensating transactions to selectively remove the data changes stored in the database system without rolling back any of said causal set of transactions, wherein at least one of the one or more compensating transactions is a new transaction in the database system that executes a set of one or more instructions that compensate the data changes made by the causal set of transactions; and
wherein the one or more first transactions, the one or more second transactions, and the one or more compensating transactions are atomically executed transactions;
wherein the method is performed by one or more computing devices.

2. The method as recited in claim 1, wherein identifying one or more second transactions includes identifying the one or more second transactions from information stored in at least one of a redo log or undo log.

3. The method as recited in claim 1, wherein a particular transaction in the causal set performs a write operation on a row in a table at a first time and another transaction in the causal set performs another write operation on the row, and wherein the first time is before the second time.

4. The method as recited in claim 3, wherein the other transaction in the causal set performs an additional write operation in a different data location in the database system, and wherein the different data location is one of a different row in the table or a row in a different table.

5. The method as recited in claim 1, wherein a particular transaction in the causal set inserts a row in a table at a first time and another transaction in the causal set manipulates the row, wherein said manipulation is not an insertion operation, and wherein the first time is before the second time.

6. The method as recited in claim 1, wherein a particular transaction in the causal set inserts a row in a parent table at a first time and another transaction in the causal set inserts one or more rows in a child table at a second time, and wherein the first time is before the second time.

7. The method as recited in claim 1, wherein a particular transaction in the causal depends on another transaction in the causal set through a logical constraint dependency.

8. The method as recited in claim 1, wherein at least one transaction of the one or more first transactions and the one or more second transactions comprises a parallel data manipulation language statement.

9. The method as recited in claim 1, wherein at least one transaction of the one or more first transactions and the one or more second transactions creates an advanced queuing message.

10. The method as recited in claim 1, wherein the one or more third transactions, when executed, perform compensating database operations in the reverse order as compared with compensated data operations that initially create the data changes.

11. The method as recited in claim 1, wherein identifying one or more second transactions comprises:
maintaining a list of compensated and compensating transactions;
identifying one or more candidate transactions for the one or more second transactions;
determining whether a candidate transaction in the one or more candidate transactions can be found in the list; and
in response to a determination that the candidate transaction in the one or more candidate transactions can be found in the list, excluding the candidate transaction from being included in the one or more second transaction.

12. A volatile or non-volatile computer-readable medium carrying one or more sequences of instructions which, when executed by one or more processors, causes the one or more processors to perform:
identifying one or more second transactions in a database system that executes transactions atomically, each of which logically depends on at least one first transaction of one or more first transactions, wherein said identifying one or more second transactions comprises identifying at least one second transaction that has a read-after-write dependency that is based on said at least one second transaction (1) reading but not changing a data item changed by said at least one first transaction and (2) changing a different data item different than said data item changed by said at least one first transaction;
identifying data manipulations made by the one or more first transactions and the one or more second transactions as data changes stored in the database system to be removed;
establishing the one or more first transactions and the one or more second transactions as a causal set of transactions; and
generating, based on the causal set of transactions, one or more compensating transactions to selectively remove the data changes stored in the database system without rolling back any of said causal set of transactions, wherein at least one of the one or more compensating transactions is a new transaction in the database system that executes a set of one or more instructions that compensate the data changes made by the causal set of transactions; and
wherein the one or more first transactions, the one or more second transactions, and the one or more compensating transactions are atomically executed transactions.

13. The medium as recited in claim 12, wherein the one or more sequences of instructions comprise instructions which, when executed by one or more processors, causes the one or more processors to perform identifying the one or more second transactions from information stored in at least one of a redo log or undo log.

14. The medium as recited in claim 12, wherein a particular transaction in the causal set performs a write operation on a row in a table at a first time and another transaction in the causal set performs another write operation on the row, and wherein the first time is before the second time.

15. The medium as recited in claim 14, wherein the other transaction in the causal set performs an additional write operation in a different data location in the database system, and wherein the different data location is one of a different row in the table or a row in a different table.

16. The medium as recited in claim 12, wherein a particular transaction in the causal set inserts a row in a table at a first time and another transaction in the causal set manipulates the row, wherein said manipulation is not an insertion operation, and wherein the first time is before the second time.

17. The medium as recited in claim 12, wherein a particular transaction in the causal set inserts a row in a parent table at a first time and another transaction in the causal set inserts one or more rows in a child table at a second time, and wherein the first time is before the second time.

18. The medium as recited in claim 12, wherein a particular transaction in the causal depends on another transaction in the causal set through a logical constraint dependency.

19. The medium as recited in claim 12, wherein at least one transaction of the one or more first transactions and the one or more second transactions comprises a parallel data manipulation language statement.

20. The medium as recited in claim 12, wherein at least one transaction of the one or more first transactions and the one or more second transactions creates an advanced queuing message.

21. The medium as recited in claim 12, wherein the one or more third transactions, when executed, perform compensating database operations in the reverse order as compared with compensated data operations that initially create the data changes.

22. The medium as recited in claim 12, wherein the one or more sequences of instructions comprise instructions which, when executed by one or more processors, causes the one or more processors to perform:

maintaining a list of compensated and compensating transactions;

identifying one or more candidate transactions for the one or more second transactions;

determining whether a candidate transaction in the one or more candidate transactions can be found in the list; and in response to a determination that the candidate transaction in the one or more candidate transactions can be found in the list, excluding the candidate transaction from being included in the one or more second transaction.

* * * * *

UNITED STATES PATENT AND TRADEMARK OFFICE
CERTIFICATE OF CORRECTION

| | | |
|---|---|---|
| PATENT NO. | : 7,873,605 B2 | Page 1 of 1 |
| APPLICATION NO. | : 11/699689 | |
| DATED | : January 18, 2011 | |
| INVENTOR(S) | : Manosiz Bhattacharyya et al. | |

It is certified that error appears in the above-identified patent and that said Letters Patent is hereby corrected as shown below:

In column 2, line 19, before "DESCRIPTION" insert -- BRIEF --.

In column 2, line 22, delete "n," and insert -- limitation, --, therefor.

In column 2, line 23, delete "similar" and insert -- refer to similar --, therefor.

In column 12, line 25, delete "Compensation" and insert -- compensating --, therefor.

Signed and Sealed this
Fourth Day of October, 2011

David J. Kappos
*Director of the United States Patent and Trademark Office*